United States Patent [19]

Merritt

[11] 4,144,151

[45] Mar. 13, 1979

[54] PRODUCTION OF $B_{10}H_{14}$ FROM $B_2H_6$ AT ROOM TEMPERATURE BY LASER INDUCED CHEMISTRY USING DF LASER

[75] Inventor: James A. Merritt, Pulaski, Tenn.

[73] Assignee: The United States of America as represented by the Secretary of the Army, Washington, D.C.

[21] Appl. No.: 914,698

[22] Filed: Jun. 12, 1978

[51] Int. Cl.² .............................................. B01J 1/10
[52] U.S. Cl. ..................... 204/157.1 R; 204/DIG. 11
[58] Field of Search ................. 204/157.1 R, DIG. 11

[56] References Cited

PUBLICATIONS

Bachmann et al., Chemical Physics Letters, vol. 29, No. 4 (Dec. 15, 1974) pp. 627–629.

*Primary Examiner*—Howard S. Williams

*Attorney, Agent, or Firm*—Nathan Edelberg; Robert P. Gibson; Jack W. Voigt

[57] ABSTRACT

A method for the production of $B_{10}H_{14}$ by laser induced chemistry is disclosed. A DF laser is used to irradiate a laser reaction cell containing diborane ($B_2H_6$). The $P_{12}$ (2611 cm$^{-1}$) frequency of the 1-0 band of the DF laser is resonant with the $\nu_8$ (2614 cm$^{-1}$) vibrational fundamental of $B_2H_6$ and starts a chain reaction producing solid white crystals of $B_{10}H_{14}$ that condense on the walls of the laser reaction cell. The method is carried out at room temperature. Thus, the chemical engineering is very simple. The $B_{10}H_{14}$ produced is of high purity and high yield. The production of decaborane-14 from diborane by DF laser induced chemistry (LIC) represents an efficient synthesis of a large polyatomic molecule of high purity by LIC.

7 Claims, 3 Drawing Figures

PRODUCTION OF $B_{10}H_{14}$ FROM $B_2H_6$ AT ROOM TEMPERATURE BY LASER INDUCED CHEMISTRY USING DF LASER

DEDICATORY CLAUSE

The invention described herein may be manufactured, used, and licensed by or for the Government for governmental purposes without the payment to me of any royalties thereon.

BACKGROUND OF THE INVENTION

High performance solid propellant fueled rocket motors require burning rate catalysts to achieve fast burn rates. Presently, n-hexylcarborane (NHC) is considered to be one of the most suitable burning rate catalysts for solid propellant fuels. NHC production involves reacting 1-octyne with decaborane-14. The price and quantity limiting factor in the supply of NHC is the lack of an industrial process for synthesizing large quantities of decaborane inexpensively.

The production of decaborane-14 ($B_{10}H_{14}$) by pyrolysis is the usual commercial source of this precursor material for NHC. The complexity of the chemical engineering for the usual commercial source method for $B_{10}H_{14}$ in large quantities is very expensive. The high expense relates partly to the fact that thermal (pyrolysis) methods of influencing chemical processes lead, mainly, to the excitation of all degrees of freedom of the molecule. Both external (translational) and internal (electronic, vibrational, and rotational) degrees of freedom are usually in thermodynamic equilibrium. In addition to there being an unproductive waste of energy, reactions with equilibrium excited molecules characteristically proceed in the direction of the breaking of the weakest bond, completing a considerable percent of back reactions, completing many side reactions, and producing polymers, many of which are not the desired product.

Desirable would be a method for chemical conversions of substances wherein the emphasis of influence is on the individual bonds, not on the molecule as a whole. Considerable savings should result from a method which does not effect the molecule as a whole wherein numerous undesirable side reactions are initiated and completed.

Particularly desirable would be a method for inducing a chemical reaction by irradiation to achieve production of a desired compound of high purity and high yield.

Therefore, an object of this invention is to provide a method for producing decaborane-14 from diborane by laser induced chemistry.

A further object of this invention is to provide a method for producing decaborane-14 from diborane by laser induced chemistry wherein the method is carried out at room temperature to produce the desired product of high purity and high yield.

SUMMARY OF THE INVENTION

A DF laser is used to irradiate a cell containing diborane ($B_2H_6$) at room temperature (25° C.). Decaborane-14 ($B_{10}H_{14}$) is produced in high purity and high yield by laser augmented chemistry in accordance with the following chemical equation:

$$10B_2H_6 + nh\nu \rightarrow B_{10}H_{14} + 2B_5H_9 + 14H_2, \qquad (1)$$

wherein $nh\nu$ is a predetermined level of irradiation with the laser frequency defined as follows: $P_{12}$ (2611 cm$^{-1}$) 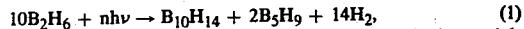 frequency of the 1–0 band from a deuterium fluoride laser (DF laser).

The $P_{12}$ (2611 cm$^{-1}$) frequency of the 1–0 band of the DF laser is resonant with the $\nu_8$ (2614 cm$^{-1}$) vibrational fundamental of $B_2H_6$. The DF laser frequency is strongly absorbed by the $B_2H_6$ and starts a chain reaction producing solid white crystals of $B_{10}H_{14}$ that condense on the walls of the laser reaction cell. This all takes place at room temperature. The production of decaborane-14 from diborane by DF laser induced chemistry in accordance with Equation 1 represents a most efficient synthesis of a large polyatomic molecule of high purity by LIC.

BRIEF DESCRIPTION OF THE DRAWINGS

The Figures of the drawing are infrared spectra (IR) curves.

DESCRIPTION OF THE PREFERRED EMBODIMENT

Pure $B_{10}H_{14}$ is produced in high yields at room temperature (25° C.) by laser induced chemistry (LIC) in accordance with the method of this invention and the laser augmented chemistry in accordance with the following chemical equation:

$$10B_2H_6 + nh\nu \rightarrow B_{10}H_{14} + 2B_5H_9 + 14H_2,$$

wherein $nh\nu$ is as earlier defined herein.

The preferred level of irradiation for maximum yield of $B_{10}H_{14}$, without the production of undesirable polymers, should not exceed about 15 watts/cm$^2$.

Experimental

Figure 1:
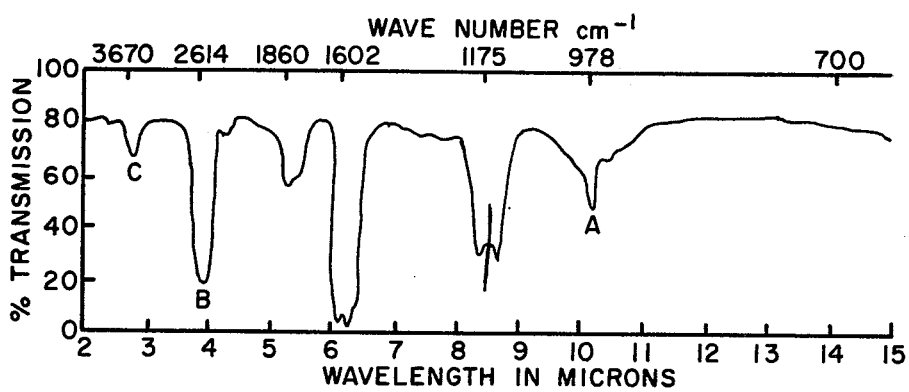
FIG. 1 is an IR spectrum of high purity, gaseous $B_2H_6$ depicting vibrational bands resonant with DF laser, shown as B, as compared with vibrational bands resonant with $CO_2$ laser, shown as A, and as compared with vibrational bands resonant with HF laser, shown as C.
Figure 2:
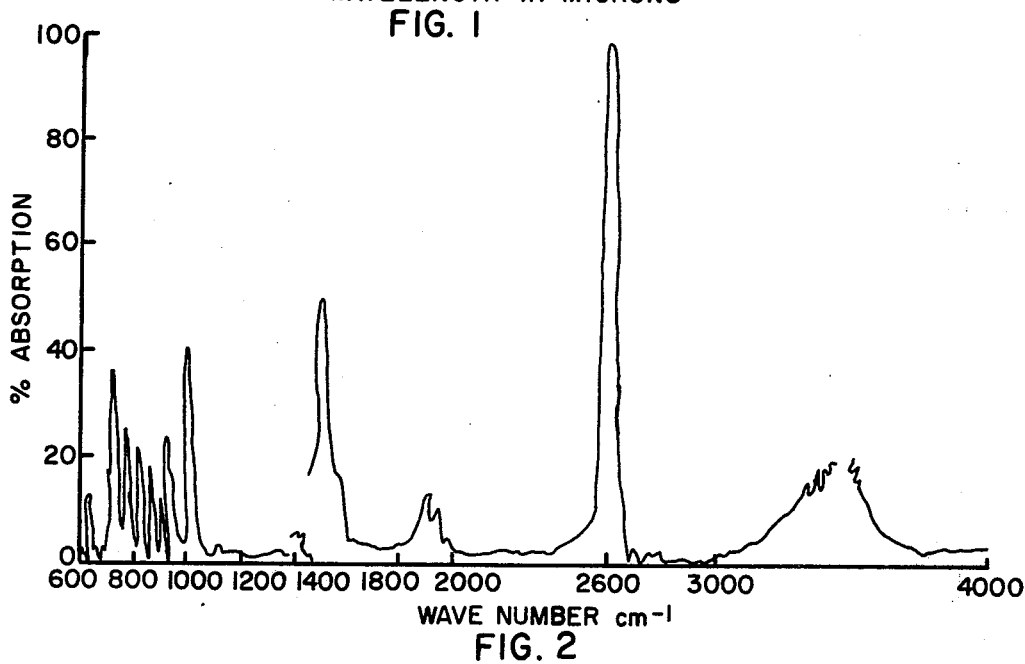
FIG. 2 is a Nujol mull spectrum of commericial, high purity crystalline $B_{10}H_{14}$.

To avoid handling and storing the usual large (1 lb.) commercial quantities of $B_2H_6$ a 1% gaseous mixture of $B_2H_6$ in argon (Ar) was employed as supplied by the Linde Corporation. Immediately prior to irradiation, the $B_2H_6$ was recovered from Ar by passing the mixture  into a condenser cooled to −286° C. by an external bath of liquid Ar. A quantity of $B_2H_6$ sufficient for several irradiations was thus collected as a solid (F.P. = −126° C.) while the remaining Ar gas was pumped out of the system. Filling of cells and temporary storage of collected $B_2H_6$ was facilitated by transferring the $B_2H_6$ from the condenser to a cold storage bulb by allowing the condenser to warm up to ambient temperature. A cell was then filled by connecting it through a valve and quick disconnect fitting to the vacuum system and adjusting the storage bulb temperature to obtain the desired cell pressure. Typically, brass or stainless steel cells 10 cm in length fitted with 3 cm diameter windows of NaCl, KCl, or KBr were used. The infrared spectrum (FIG. 1) of the diborane did not reveal the presence of any impurities.

The DF laser irradiation was accomplished with a 1 kW pulsed chemical laser by "Fresnelling off" 10-20 watts. After irradiation for a given period of time and at varying powers the spectra of static products were obtained using both a Beckman IR5 spectrometer and a DIGILAB FTS-20B Fast Fourier Transform Spectrometer.

"Fresnelling off" is the term applied where the Fresnel effect is employed to direct a portion of the laser beam through the window of the reaction cell. This is to permit the use of only that amount of irradiation energy desired. The remaining energy can be diverted by other Fresnel plates to other experiments or it can be discharged to a collector plate for dissipation of energy.

Thus, when $B_2H_6$ (10 Torr in a 10 cm by 3 cm gas cell) was irradiated with the $P_{12}$ (1-0 band) DF laser frequency (2614 cm$^{-1}$), clear-white crystals were deposited on the cell walls. The power diverted into the cell from the one kW laser beam was 13 watts. The DF laser was a large pulsed (13 second duration) chemical laser and the target (cell) was placed some 100 yards from the laser. The laser beam entering the cell was a collimated beam one inch in diameter so that most of the volume of the cell was illuminated. The temperature rise of the cell wall was negligible (less than 5° C.).

Figure 3:
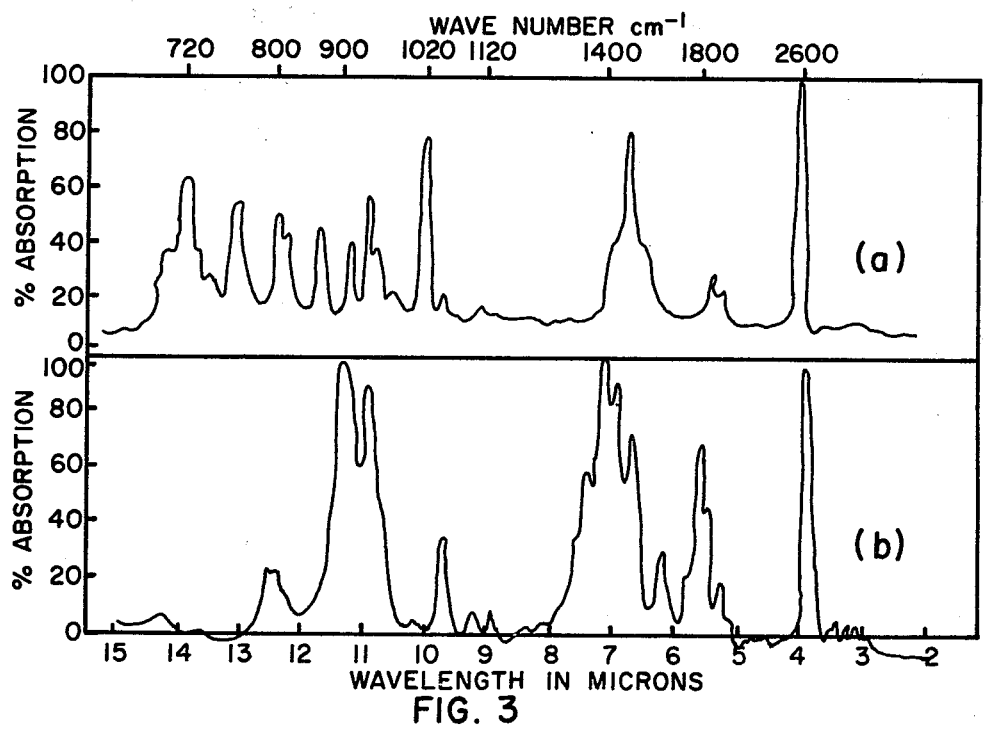
FIG. 3a is a low resolution Nujol mull spectrum of the crystalline white solid product produced from DF laser irradiated $B_2H_6$ which when compared with FIG. 2 shows peaks corresponding to the peaks for known $B_{10}H_{14}$.
FIG. 3b is a low resolution IR spectrum of the $B_5H_9$ (gaseous) product from DF laser irradiated $B_2H_6$.

The spectrum of the cell contents revealed that the products observed were $B_5H_9$ (gas) as shown by IR spectrum of FIG. 3b and $B_{10}H_{14}$ (solid) as shown by Nujol mull spectrum of FIG. 3a.

Prior to analysis, the crystalline product was removed from the cell by dissolving in MCH (methylcyclohexane) and later recrystallized in a controlled atmosphere dry box. A melting point determination revealed that the crystals melt at 96° C. The melting point together with the IR spectrum of the material in a Nujol mull (FIG. 3a) showed the crystals to be pure $B_{10}H_{14}$.

The experimental data establishes a preferred pressure range of $B_2H_6$ in the reaction cell from about 10 to about 400 Torr. The reaction exposure time from about 1 second to about 13 seconds indicates that the reaction is fully completed. Thus, if a pulsed laser of 13 seconds duration time is employed, a power level of about 13 watts should be employed for the actual irradiation. A CW multiline DF laser operating at a predetermined power level can also be employed. The power level of either the pulsed or CW laser should be maintained at the appropriate exposure level. The reason for maintaining the power level for irradiation below a certain threshold level is to avoid production of undesired products which results in lower yield of $B_{10}H_{14}$ as well as producing $B_{10}H_{14}$ that is contaminated with high polmeric products.

The production of $B_{10}H_{14}$ by LIC conducted at room temperature offers particular advantages over high temperature synthesis. In addition to those advantages of reactions taking place at room temperature, the advantages of making a product with fewer impurities which lessens the problems of product separation and of making a product of higher yield should both contribute to cost effectiveness for production of $B_{10}H_{14}$ as a precursor for burning rate catalysts.

The production method of this invention is applicable to either batch production or continuous mode of production by employing a plurality of laser reaction cells for pulsed exposures from a refracted pulsed DF laser wherein a portion of the power level is diverted as required for irradiating at the proper watts/cm$^2$ or by employing a CW multiline laser for continuous irradiating at the proper watts/cm$^2$ to form $B_{10}H_{14}$ with the method including a means for continually removing the $B_{10}H_{14}$ formed. It has been determined that a cold finger is a suitable means for removing the $B_{10}H_{14}$. Other suitable means and techniques established in the art can be employed in conjunction with the method of this invention for removal of the solid product as the method of production is continued.

It has been determined that an irradiation power level at or below a threshold value of about 15 watts/cm$^2$ is preferred for producing high purity $B_{10}H_{14}$ that is free of polymerized impurities. A higher irradiation level produces a polymer product. The product $B_5H_{11}$ which is always present in pyrolysis method of producing $B_{10}H_{14}$ was never observed in LIC synthesis at or below the threshold level.

A series of laser reaction cells can be employed where greater production is required. Other arrangements can be employed where greater production is required. Other arrangements can be adapted for use in conjunction with the method of this invention which are compatible with the requirements such as production quantities, separation techniques etc., at a particular installation.

The method of this invention can utilize any high purity $B_2H_6$. The purity is recommended to be confirmed by IR spectra prior to filling of laser reaction cell. This technique would ensure that no undesired side reactions and impurities will result which will ensure that the purity of the $B_{10}H_{14}$ produced by this method is a product of high purity which requires no further purification. U.S. Pat. No. 4,070,261 issued on Jan. 24, 1978 to James A. Merritt, Pulaski; Lawrence C. Robertson, Fayetteville, both of Tennessee, and assigned to the United States of America as represented by the Secretary of the Army, Washington, D.C., discloses a method for producing $B_2H_6$ by laser induced chemistry. This method comprises irradiating $BCl_3$ and $H_2$ to form $HBCl_2$ + HCl. The intermediate $HBCl_2$ is allowed to undergo a disproportionation reaction wherein $B_2H_6$ and $BCl_3$ are formed. The $B_2H_6$ is separated from unreacted products. The $BCl_3$ can be used in a recycling phase for further use in the method. Thus, the $B_2H_6$ produced by LIC as described above would be a desirable source of the $B_2H_6$ which is irradiated in accordance with the method of this invention to produce $B_{10}H_{14}$.

I claim:

1. A method for producing $B_{10}H_{14}$ from $B_2H_6$ by laser induced chemistry comprising:

i. filling one or more laser reaction cells with $B_2H_6$ to a predetermined pressure from about 10 to about 400 Torr;

ii. irradiating said $B_2H_6$ with a predetermined power level of a DF laser selected from a pulsed laser and a CW multiline laser, said irradiating accomplished over a predetermined time period from about one to about 13 seconds by employing the $P_{12}$ (2611 cm$^{-1}$) frequency of the 1-0 band of said DF laser, said frequency being resonant with the $\nu_8$ (2614 cm$^{-1}$) vibrational fundamental of said $B_2H_6$ and said frequency being that frequency that is strongly absorbed by said $B_2H_6$ to start a reaction which produces said $B_{10}H_{14}$ in the form of solid white crystals; and, iii. separating said $B_{10}H_{14}$ from said laser reaction cell.

2. The method of claim 1 wherein said predetermined pressure of said $B_2H_6$ in said laser reaction cell is about 10 Torr; said DF laser is a pulsed laser; said predetermined power level of said pulsed DF laser employed in said irradiating is from about 10 to about 20 watts per laser reaction cell, said about 10 to about 20 watts per laser reaction cell being diverted from said pulsed DF laser to accomplish said irradiating over a predetermined time period of about 13 seconds duration.

3. The method of claim 2 wherein said predetermined power level is about 13 watts per laser reaction cell which accomplishes said irradiating at or below an irradiating threshold level of about 15 watts/cm$^2$.

4. The method of claim 2 wherein a plurality of said laser reaction cells are filled and wherein a plurality of said laser reactions cells are simultaneously irradiated.

5. The method of claim 4 wherein said predetermined power level is about 13 watts per laser reaction cell which accomplishes said irradiating at or below an irradiating threshold level of about 15 watts/cm$^2$.

6. The method of claim 1 wherein said predetermined pressure of said $B_2H_6$ in said laser reaction cell is about 10 Torr; said DF laser is a CW multiline laser; and wherein said predetermined power level of said CW multiline laser employed in said irradiating is about 13 watts which accomplishes said irradiating at or below an irradiating threshold level of about 15 watts/cm$^2$.

7. The method of claim 6 wherein said irradiating, said forming of said $B_{10}H_{14}$, and said separating of said $B_{10}H_{14}$ is accomplished in a continuous mode of operation, and wherein said filling of said laser reaction cell is accomplished by a continuous mode of operation as required to maintain said predetermined pressure of $B_2H_6$ during said continuous mode of operation.

* * * * *